3,354,947
AIR-CONDITIONING SYSTEM FOR A MOBILE
HOME
Philip R. McKinnon, 337 Maywood Drive,
Charlotte, N.C. 28205
Filed Dec. 20, 1965, Ser. No. 514,793
12 Claims. (Cl. 165—50)

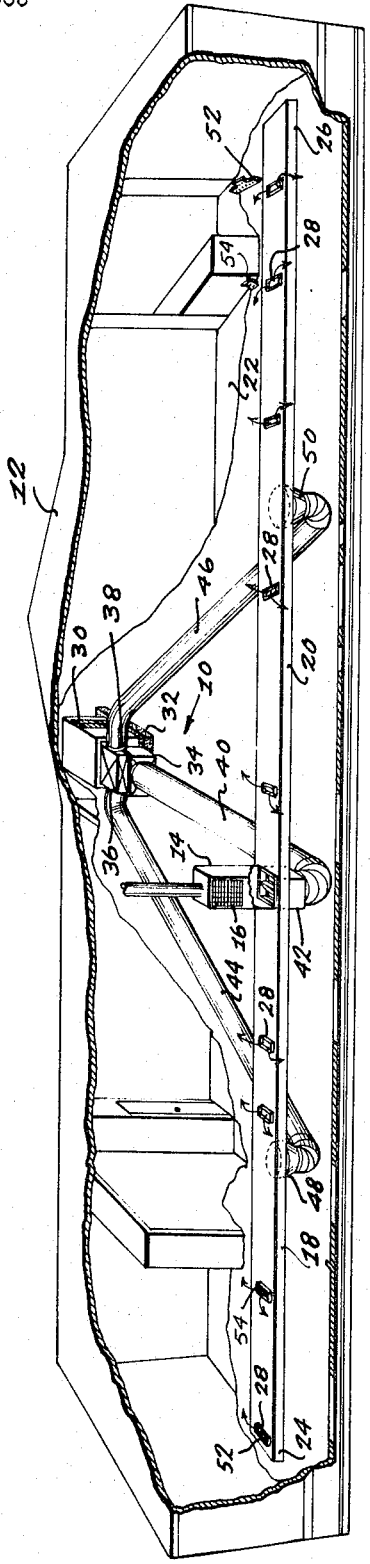

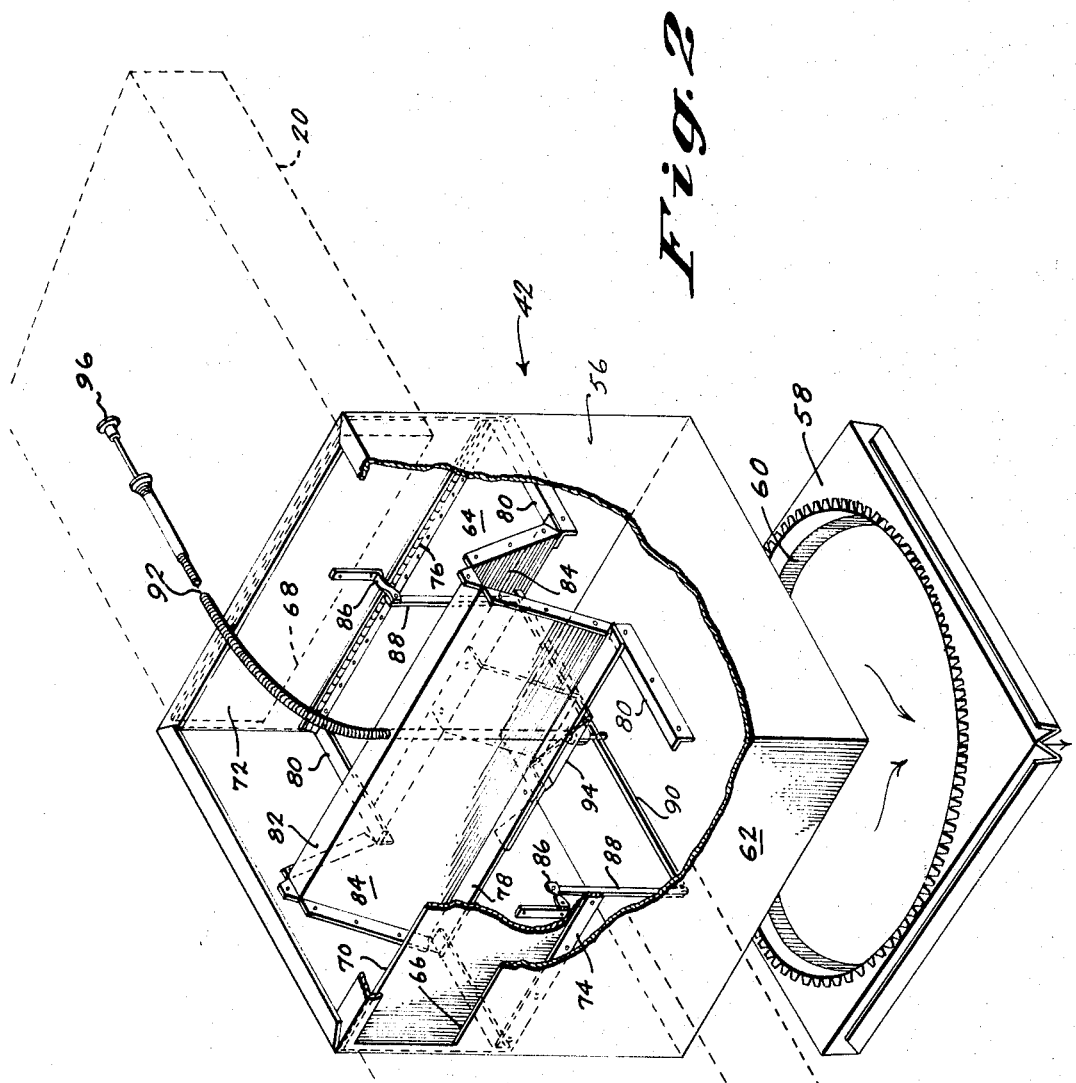

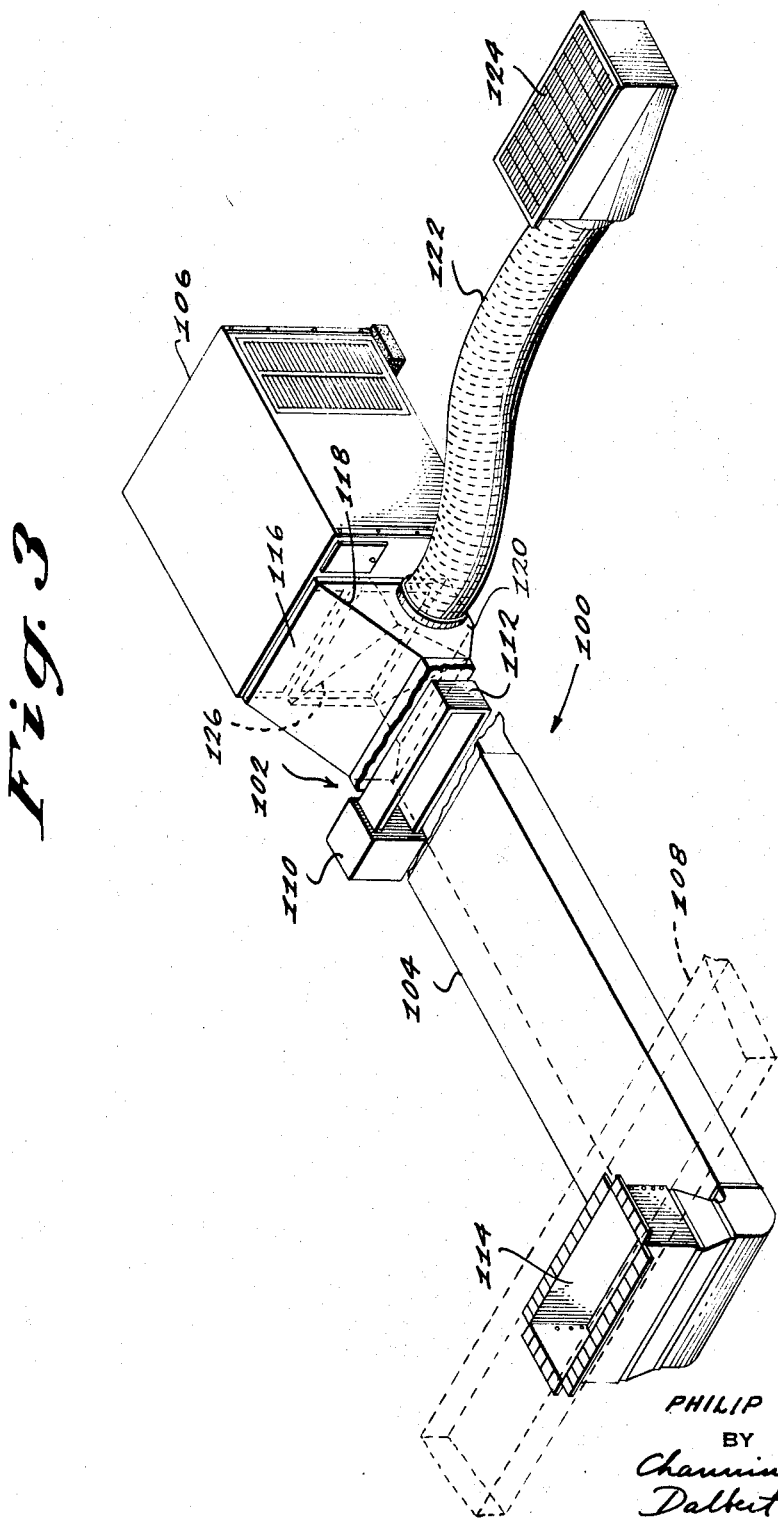

ABSTRACT OF THE DISCLOSURE

An air-conditioning system for a mobile home wherein the built-in hot-air duct of small cross-sectional area of the central heating system of a mobile home is utilized effectively in conjunction with an air-conditioning unit located exteriorly of said mobile home for noise reduction and space-saving advantages, the air-conditioning unit communicating with the interior of the mobile home through an intake duct of substantial cross-section capable of handling a large volume of air drawn from the mobile home to the air-conditioning unit, and communicating with the built-in duct through a delivery duct of substantial cross-section for delivering a large volume of conditioned air into the mobile home interior in opposite directions from the connection with the built-in duct.

---

The present invention relates to an air-conditioning system for a mobile home that provides ample air circulation for adequate air-conditioning while effectively utilizing existing heating system components in a practical and economical manner without requiring substantial additions to or modifications of the mobile home structure and without noticeably increasing the noise level within the home.

Limitations in the overall exterior dimensions of mobile home require efficient utilization of space and compact construction, particularly in the design of floors, walls and ceilings and elements confined therein, all of which must be constructed as thin as practically possible to provide a maximum of living space within the mobile home. For this reason the built-in hot-air ducts of mobile home heating systems are designed to as small a cross-section as possible for the heating system requirements so that the ducts can be located within the mobile home structure, preferably within the floor structure, without interfering with the structural members and without requiring any increase in the thickness of floor. These built-in hot-air ducts of restricted cross-section can efficiently handle the flow of hot air at the relatively low flow rate for heating, but are incapable of handling the relatively large volume of air necessary for effective air-conditioning, such that heretofore it has not been possible to obtain desired air-conditioning results using the existing built-in heating system ducts. Increasing the capacity of the air-conditioning unit itself has not eliminated this problem as the system is limited by the duct size regardless of the capacity of the air-conditioning unit. Yet it is not practical to enlarge the built-in ducts or to install special air-conditioning ducts as either of these expedients would undesirably reduce the livable space within the mobile home. The livable space is also reduced with conventional air-conditioning systems by the location of the air-conditioning units within the mobile home, which interior location additionally results in an undesirable significant increase in the noise level within the mobile home.

By the air-conditioning system of the present invention, however, the existing built-in hot-air ducts are utilized uniquely, without encroaching on the interior space within the mobile home, to obtain adequate air flow for effective air-conditioning to the extent that a relatively small capacity air-conditioning unit can provide optimum results where prior systems using much larger capacity units have given inadequate results. Further, the air-conditioning unit is located exteriorly, which importantly avoids any noticeable increase in the noise level within the home even when the air-conditioning unit has a large capacity blower incorporated therein.

It is further possible with the present invention to embody a heating unit, such as an electrical resistance coil unit, directly in the exterior portion of the system so that no furnace or other heating means need occupy any of the interior space of a mobile home. A combined heating and air-conditioning system of this type can utilize a single blower means to force air through either the heating or air-conditioning unit such that the cost of a combined system is little more than the cost of a conventional interior furnace system without air-conditioning.

Briefly described, the air-conditioning system of the present invention is adapted to a mobile home that is equipped with a central heating system which includes a built-in hot-air duct with vents opening therealong into the mobile home interior. This air-conditioning system includes an exteriorly located air-conditioning unit having intake and discharge ports with an intake duct communicating with the interior of the mobile home and the intake port of the air-conditioning unit. This intake duct, which extends exteriorly of the mobile home, is of substantial cross-section for passage of a large volume of air sufficient to provide optimum air-conditioning results. Also included in the system is a delivery duct of substantial cross-section communicating with the discharge port of the air-conditioning unit and with the built-in hot-air duct intermediate the ends of the built-in duct for distribution of conditioned air from the air-conditioning unit into the mobile home interior through the built-in duct and vents in both directions from the intermediate delivery duct communication so that the required capacity of the built-in duct is in effect divided in two and can be adequately handled by the small size built-in duct.

In the preferred embodiment the air-conditioning system utilizes the air intake port of the existing furnace, avoiding the need for the construction of a special intake for the air-conditioning system, and as the intake port is normally elevated, warm air is withdrawn from the mobile home for efficient operation of the air-conditioning system. In connecting the intake duct of the air-conditioning system to the furnace, from which the built-in hot-air ducts normally extend in opposite directions, a unique control valve is utilized. This control valve has valve plates pivoted between positions at which they close the air-conditioning intake duct during operation of the heating system and positions at which they close the built-in ducts during operation of the air-conditioning system to prevent return circulation of conditioned air from the built-in ducts to the intake duct. Conditioned air is delivered to the built-in ducts for distribution from the vents into the mobile home interior by delivery ducts extending from the exterior air-conditioning unit to the built-in ducts intermediate the ends of the built-in ducts and the furnace, which arrangement divides the flow of conditioned air between the two built-in ducts and divides this divided flow into two directions within each built-in duct so that the restricted cross-section of the built-in ducts becomes adequate to handle the volume of air flow necessary for efficient air-conditioning.

In a modified embodiment of the present invention a heating unit of the electrical resistance coil type is mounted exteriorly of the mobile home in the aforementioned delivery duct that leads from the air-conditioning unit to the built-in duct to heat the circulating air immediately prior to entering the mobile home. With this arrangement, not only is the need for an interior furnace unit eliminated, but the blower means of the air-conditioning unit can be utilized efficiently with the heating unit so that no independent blower means is necessary for the heating unit.

To increase further the capacity of the existing built-in hot-air ducts to handle the large volume of air flow necessary for adequate air-conditioning, the present invention also includes scoop-shaped deflector elements disposed in the built-in ducts at the vents to deflect the air to the vents in a manner that substantially reduces turbulence and thereby increases the efficiency of the system.

An example of the preferred embodiment is described in detail below and is illustrated in the accompanying drawings, in which:

FIG. 1 is a fragmentary perspective view of a mobile home having an air-conditioning system of the present invention incorporated therein;

FIG. 2 is an enlarged fragmentary perspective view of the control valve unit of the air-conditioning system of FIG. 1; and FIG. 3 is a perspective view of a modified embodiment that incorporates an exterior heating unit in the system.

In the embodiment illustrated in FIGS. 1 and 2, the air-conditioning system 10 is incorporated in a conventional mobile home 12 that is equipped with a central heating system that consists of a central furnace unit 14 having an elevated air-intake port 16 through which air enters for heating in the furnace and redistribution into the mobile home interior through a pair of built-in hot-air ducts 18 and 20 that extend from the furnace unit 14 longitudinally in opposite directions through the floor 22 of the mobile home to ends 24 and 26 adjacent the ends of the mobile home and along which are vents 28 opening into the mobile home interior at convenient spaced locations. These built-in ducts 18 and 20 are seen to be of restricted height so as to fit in the floor structure 22 without requiring any increase in the floor thickness, which would reduce the free space within the mobile home. However, to obtain an adequate air flow capacity the ducts 18 and 20 are extended laterally to a width substantially greater than the height. This provides adequate air flow capacity for the comparatively low circulation rate of the heating system, but is inadequate to handle the large flow rate needed for air-conditioning.

The air-conditioning system 10 includes a commercial air-conditioning unit 30 of a suitable capacity conveniently located outside of the mobile home 12 so that it does not occupy any of the interior space of the mobile home and does not contribute to the noise level therein. Preferably the unit 30 simply rests on a slab 32 on the ground adjacent the mobile home. The air-conditioning unit 30 has an air intake port 34, through which it receives air from the mobile home interior, and a pair of discharge ports 36 and 38, through which conditioned air is discharged to the mobile home interior.

The intake port 34 of the air-conditioning unit 30 is connected to the furnace unit 14 to draw air from the mobile home interior through the elevated intake port 16, which elevated disposition efficiently draws warmer air from the mobile home interior, by an intake duct 40 of substantial cross-section for handling the large air flow needed for effective air-conditioning. This intake duct 40 is preferably formed of flexible tubing for ease of assembly with the furnace and air-conditioning units. The intake duct 40 communicates with the furnace unit 14 through attachment to a control valve unit 42 mounted below the furnace unit 14 in communication therewith.

Conditioned air is discharged from the air-conditioning unit 30 through the discharge ports 36 and 38 over which are connected delivery ducts 44 and 46 of substantial cross-section to distribute the large air flow to the mobile home interior by attachment through adapter elements 48 and 50 to the built-in ducts 18 and 20 intermediate the furnace unit 14 and the ends 24 and 26 of the built-in ducts, through which air flows in both directions from adapter elements 48 and 50 for ultimate discharge through the vents 28 into the mobile home interior. As the delivery ducts 44 and 46, as well as the intake duct 40 are exteriorly located, they may be of any desirable cross-section sufficient to provide adequate air flow.

With this arrangement, the volume of conditioned air discharged by the air-conditioning unit 30 is first divided between the two delivery ducts 44 and 46, which, like the intake duct 40, are flexible tubular ducts, and each divided portion of the air flow is itself again divided to flow in opposite directions when it enters the built-in duct so that the air flow through any section of the built-in ducts 18 and 20 is only a fraction of the total air flow of the air-conditioning system 10 and, therefore, can be handled efficiently by the small size built-in ducts.

Preferably, the outermost vents are provided with scoop-shaped deflector elements 52 (shown for clarity in FIG. 1 in exploded disposition above their respective vents) that extend into the built-in ducts 18 and 20 substantially the full width of the vents to deflect the air flow smoothly from the ducts into the mobile home interior without significant turbulence. Similarly, deflector elements 54 of less than full width may be disposed in the intermediate vents with the deflector elements closest to the delivery ducts 44 and 46 being of lesser width than those farther out so as not to obstruct the necessary flow of air to the more outward vents. With these deflector elements 52 and 54 the air flow is directed efficiently such that less blower power is necessary to provide adequate circulation. As seen in FIG. 1, some of the vents may not require deflector elements or may be disposed where deflector elements would interfere with circulation of hot air during operation of the heating system.

The aforementioned control valve unit 42 includes a housing 56 secured at the bottom of the furnace unit 14 and having a bottom wall 58 apertured as at 60 for communication with the intake duct 40, which is attached thereto. The housing 56 also has opposed side walls 62 and 64 apertured as at 66 and 68 for communication with the built-in ducts 18 and 20, which are attached thereto in spaced face-to-face relation, with the delivery duct 44 below the level of the built-in ducts and aligned with the spacing therebetween.

A pair of opposed valve plates 70 and 72 are pivoted along horizontal hinges 74 and 76 secured to the interior of the housing side walls 62 and 64 below the apertures 66 and 68 and extend sufficiently to cover the apertures when the plates 70 and 72 are pivoted to a vertical position (FIG. 2) during operation of the air-conditioning system 10, during which these valve plates 70 and 72 function to prevent conditioned air in the built-in ducts 18 and 20 from entering the intake duct 40, which would reduce the efficiency of the system.

These valve plates 70 and 72 operate alternatively to close the intake duct 40 during operation of the heating system, during which they are pivoted to horizontal position in which they combine to cover the large cross-section of the intake duct 40 and in which position they seat on a valve seat 78 that extends horizontally across the housing 56 parallel with the housing side walls 62 and 64 and that has side strips 80 attached to the housing 56 for seating of the side edges of the valve plates 70 and 72.

The valve seat 78 is further formed with a central portion 82 that extends upwardly into the space between the opposing built-in ducts 19 and 20 and has converging surfaces 84 inclined with respect to the built-in ducts for diverting air thereto during operation of the heating system.

The valve plates 70 and 72 may be pivoted between horizontal and vertical positions in any conventional manner. In the embodiment illustrated, this is done by operation of a mechanical linkage that includes fingers 86 and 88 fixed to the underside of the plates and extending normally therefrom and to the outer ends of which are pivoted connecting rods 88 and 90 that hang therefrom and are connected at their lower ends to a common horizontal operating bar 90 that is raised or lowered to operate the linkage to pivot the valve plates 70 and 72 by a Bowden wire 92 mounted in a bracket 94 depending from the valve seat 78. This Bowden wire 94 extends to an operating plunger 96 conveniently located within the mobile home for manual operation of the valve plates 70 and 72.

The flow of air can also, if desired, be controlled at the connection of the adapter elements 48 and 50 by incorporating baffles (not shown) of any conventional design and operation to regulate the division of air entering the built-in ducts 18 and 20 and to close off the delivery ducts 44 and 46 during operation of the heating system.

In the modified embodiment illustrated in FIG. 3, the air-conditioning system 100 incorporates heating means 102 disposed exteriorly of the mobile home in the relatively large capacity delivery duct 104 that leads from the air-conditioning unit 106 to the built-in duct 108 within the mobile home. This heating means 102 is a conventional electrical resistance coil type heater that is commercially available. It has a base 110 disposed at the side of the delivery duct 104 and from which a U-shaped coil housing 112 extends laterally into the duct to heat air that is forced through the loop of the coil housing 112 by the blower of the air-conditioning unit 106. The heating means 102 is readily mounted simply by sliding the coil housing 112 through the side of the delivery duct 104.

With this heating means 102 no furnace is needed within the mobile home, thereby providing more available living space, which can be taken advantage of especially when this system is incorporated in the original design of the mobile home.

As seen in FIG. 3, the system 100 has only a single delivery duct 104 in which the heating means 102 is mounted. This single delivery duct 104 opens, as at 114, into the built-in duct 104 intermediate the ends thereof, thereby obtaining the advantage of divided air flow in the small capacity built-in duct as discussed above in relation to the embodiment of FIG. 1.

If a system has more than one delivery duct, as in the FIG. 1 embodiment for example, a heating unit may be mounted in each delivery duct or a single heating unit can be located in the system in advance of the air flow division to the individual delivery ducts. Thus, in the FIG. 3 embodiment, in which the heating means 102 is disposed in the connecting section 116 from which the delivery duct 104 extends, the system could be modified to provide two or more delivery ducts to the connecting section so that the air, after being heated by the heating means, would be divided for flow through each of the ducts.

The connecting section 116 is formed with a delivery chamber 118 that connects the delivery duct 104 to the air-conditioning unit 106 and a return chamber 120 therebelow to the side of which is connected the relatively large capacity intake duct 122 for intake of air from a register 124 in the floor or wall of the mobile home to the air-conditioning unit 106. These chambers 118 and 120 are separated by an interior baffle plate 126 that tapers from the side connection for the intake duct to the air-conditioning unit to direct the flow of intake air effectively to the air-conditioning unit 106.

The above-described air-conditioning system of either embodiment is easily incorporated in a moble home without modifying the mobile home interior as the control valve unit 42 and the adapter elements 48 and 50 of the FIGS. 1 and 2 embodiment are attached to the undersides of the furnace unit 14 and built-in ducts 18 and 20, respectively, from the exterior of the mobile home floor 22 as are the delivery and intake ducts 104 and 122, respectively, of the FIG. 3 embodiment. The only other attachment necessary is the mounting of the Bowden wire plunger 96 and a thermostat control (not shown) of conventional design for controlling the air-conditioning unit, and heating means, to obtain a desired temperature within the mobile home. Not only is the attachment simple to accomplish, but the system can be disconnected readily should it be desired to relocate the mobile home.

This invention has been described in detail above for purposes of illustration only and is not intended to be limited by this description or otherwise except as defined in the appended claims.

I claim:

1. In a mobile home equipped with a central heating system that includes a built-in hot-air duct of small cross-sectional area having vents opening therealong into the mobile home interior, an air-conditioning system comprising an air-conditioning unit located exteriorly of said mobile home and having intake and discharge ports, an intake duct communicating with the interior of the mobile home and the intake port of said exterior air-conditioning unit and being of substantial cross-section for passage of a large volume of air from the mobile home interior to the air-conditioning unit, and a delivery duct of substantial cross-section communicating with the discharge port of said exterior air-conditioning unit and said built-in duct intermediate the ends of the built-in duct for distribution of conditioned air from said air-conditioning unit into the mobile home through the built-in duct and vents in both directions from said intermediate delivery duct communication.

2. An air-conditioning system for a mobile home according to claim 1 and characterized further by heating means disposed in one of said air-conditioning unit, intake duct and delivery duct exteriorly of said mobile home.

3. An air-conditioning system for a mobile home according to claim 1 and characterized further by an electrical resistance coil type heating means disposed in said delivery duct exteriorly of said mobile home.

4. An air-conditioning system for a mobile home according to claim 1 and characterized further by deflector elements disposed in said built-in duct at said vents for deflection of air from the built-in ducts to the vents without significant turbulence.

5. An air-conditioning system for a mobile home according to claim 4 and characterized further in that a plurality of said vents are disposed outwardly of the communication of said delivery duct with said built-in duct and said deflector elements are of varying widths increasing in relation to the spacing from said delivery duct.

6. In a mobile home equipped with a central heating system that includes a furnace with an elevated air intake port and a built-in hot-air duct of small cross-sectional area leading from the furnace with vents opening therealong into the interior of the mobile home, an air-conditioning system comprising an air-conditioning unit located exteriorly of said mobile home and having intake and discharge ports, an intake duct communicating with the furnace and the intake port of said exterior air-conditioning unit for delivery of air from the mobile home interior through said elevated furnace intake port to said air-conditioning unit and being of substantial cross-section for passage of a large volume of air, and a delivery duct of substantial cross-section communicating with the discharge port of said exterior air-conditioning unit and said built-in duct intermediate the furnace and the end of the built-in duct for distribution of conditioned air from said air-conditioning unit into the mobile home through the built-in duct and vents in both directions from said intermediate delivery duct communication.

7. In a mobile home, an air-conditioning system according to claim 6 and characterized further by a control valve at said furnace through which said built-in duct and said intake duct communicate with said furnace, said control valve being operable alternatively to close said intake duct at the furnace during operation of the heating system and to close said built-in duct at the furnace during operation of the auxiliary air-conditioning system.

8. In a mobile home, an air-conditioning system according to claim 6 and characterized further in that a pair of said built-in ducts extend in opposite directions from said furnace and by a control valve at said furnace through which said pair of built-in ducts and said intake duct communicate with said furnace, said control valve being operable alternatively to close said intake duct at the furnace during operation of the heating system and to close both of said built-in ducts at the furnace during operation of the air-conditioning system.

9. In a mobile home, an air-conditioning system according to claim 8 and characterized further in that said pair of built-in ducts are disposed at said furnace in spaced face-to-face relation, said intake duct is disposed at said furnace adjacent said built-in ducts and aligned with the spacing therebetween, and said control valve comprises a valve seat extending across said intake duct and a pair of valve plates pivoted between said built-in ducts and said intake ducts for seating on said valve seat to close said intake duct during operation of the heating system and operable alternatively to close said built-in ducts during operation of said air-conditioning system.

10. In a mobile home, an air-conditioning system according to claim 9 and characterized further in that said valve seat has a central portion extending into the space between said built-in ducts with converging surfaces inclined with respect to said built-in ducts for diverting hot air to said built-in ducts during operation of the heating system.

11. In a mobile home equipped with a heating system that includes an elongated built-in hot-air duct of small cross-sectional area having a plurality of vents opening therealong into the interior of the mobile home, an air-conditioning system comprising an air-conditioning unit located exteriorly of said mobile home and having an intake port and a discharge port, an intake duct communicating with the interior of the mobile home and the intake port of said exterior air-conditioning unit and being of substantial cross-section for passage of a large volume of air from the mobile home to the air-conditioning unit, and a pair of delivery ducts of substantial cross-section communicating with the discharge port of said air-conditioning unit and with said built-in duct at spaced locations intermediate the ends of the built-in duct for distribution of conditioned air into the mobile home from said air-conditioning unit through the built-in duct and vents in both directions from each of said intermediate delivery duct communications with the built-in duct.

12. In a mobile home equipped with a heating system, an air-conditioning system according to claim 11 and characterized further by heating means disposed in said system exteriorly of said mobile home for heating air to be delivered to the interior of the mobile home.

References Cited
UNITED STATES PATENTS

| | | | |
|---|---|---|---|
| 1,878,503 | 9/1932 | Martin | 165—27 |
| 2,753,157 | 7/1956 | Hoyer | 165—22 |
| 2,804,816 | 9/1957 | Hoyer | 98—33 |
| 2,863,606 | 12/1958 | Tatsch | 98—33 |

EDWARD J. MICHAEL, *Primary Examiner.*

CHARLES SUKALO, *Examiner.*